US007612655B2

(12) United States Patent
Kolz et al.

(10) Patent No.: US 7,612,655 B2
(45) Date of Patent: Nov. 3, 2009

(54) ALARM SYSTEM FOR HEARING IMPAIRED INDIVIDUALS HAVING HEARING ASSISTIVE IMPLANTED DEVICES

(75) Inventors: Daniel Paul Kolz, Rochester, MN (US); Garry Joseph Sullivan, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 11/558,001

(22) Filed: Nov. 9, 2006

(65) Prior Publication Data

US 2008/0111677 A1 May 15, 2008

(51) Int. Cl.
*H04B 3/36* (2006.01)

(52) U.S. Cl. .............................. 340/407.1; 340/539.11; 607/57

(58) Field of Classification Search ............. 340/407.1, 340/539.11, 691.1, 692; 607/57
See application file for complete search history.

(56) References Cited

U.S. PATENT DOCUMENTS

| | | | | |
|---|---|---|---|---|
| 4,777,474 | A | 10/1988 | Clayton | |
| 5,721,783 | A * | 2/1998 | Anderson | 381/328 |
| 5,941,905 | A * | 8/1999 | Single | 607/57 |
| 6,067,006 | A | 5/2000 | O'Brien | |
| 2005/0141736 | A1 | 6/2005 | Beimel et al. | |
| 2007/0055321 | A1* | 3/2007 | Gordon et al. | 607/55 |

OTHER PUBLICATIONS

"Alerter" (Product Description published on the World Wide Web at www.deaf-alerter.com/alerter.htm, publication date unknown but prior to Apr. 2, 2006).

"Night Cradle" (Product Description published on the World Wide Web at www.deaf-alerter.com/nightcradle.htm, publication date unknown but prior to Apr. 2, 2006).

"Digital Earlarm II" (Product Description published on the World Wide Web at us.gizmodo.com/gadgets/gadgets/digital-earlarm-ii-131532.php, claimed date Oct. 18, 2005).

"Earlarm II" (Product Description published on the World Wide Web at www.trymax.co.kr/docs/earlarm.htm, publication date unknown but prior to Apr. 2, 2006).

"Personal Ear Alarm Network" (Published on the World Wide Web at repo-nt.tcc.virginia.edu/classes/tcc315_2003/materials/mod2example/Module2%20C%20paper.pdf, apparently by unnamed students at the University of Virginia, publication date unknown).

Abledata, "Informed Consumer Guide to Assistive Technology for People with Hearing Disabilities" (Published on the World Wide Web at www.abledata.com/abledata_docs/icg_hear.htm, claimed date Feb. 1999).

"Cochlear Implants" (Product Description published on the World Wide Web at www.kidshealth.org/parent/system/surgical/cochlear.html, publication date unknown but prior to Apr. 2, 2006).

* cited by examiner

*Primary Examiner*—Thomas J Mullen
(74) *Attorney, Agent, or Firm*—Roy W. Truelson

(57) ABSTRACT

An alarm system for certain hearing impaired individuals having implanted hearing assistive devices contains a device for detecting an alarm condition, and a transmitter which is tuned to a resonant frequency of an implanted passive energy portion of a cochlear implant or similar device. Upon detection of an alarm condition, the transmitter transmits an alarm signal at the resonant frequency, causing the implanted device to resonate even in the absence of the externally worn hearing assistive portion. Resonance is perceived by the hearing impaired individual as a buzzing or other abnormal noise, alerting the individual to the alarm condition.

20 Claims, 4 Drawing Sheets

ALARM SYSTEM FOR HEARING IMPAIRED INDIVIDUALS HAVING HEARING ASSISTIVE IMPLANTED DEVICES

FIELD OF THE INVENTION

The present invention relates to alarm systems for warning or alerting individuals of some condition, and in particular, to alarm systems for warning or alerting hearing impaired individuals who have cochlear implants or similar implantable devices.

BACKGROUND OF THE INVENTION

Great advances in hearing assistive technology in recent years have improved the lives of many hearing impaired individuals and enabled people to hear better, or in some cases, to hear at all. Various hearing assistive devices exist for alleviation of different conditions. Among these devices is a type of device known as a cochlear implant.

Cochlear implants are generally intended for certain people with profound hearing loss. In a typical cochlear implant user, the function of the inner ear is severely degraded, and therefore the condition does not respond well to conventional hearing appliances, which simply amplify the sound entering the ear canal. A cochlear implant by-passes the inner ear to transmit sound directly to the cochlea. A variation of the cochlear implant is an auditory brainstem implant, which is an implantable device placed near the junction of the cochlea and auditory nerve, to by-pass even the cochlea where appropriate.

Generally, a cochlear or other implantable hearing assistive device comprises a surgically implanted portion and an externally worn portion. The externally worn portion is a digital electronic device receiving power from a battery, and containing a microphone, amplification, filtering and/or sound processing electronics, and a transmitter. The externally worn portion may be packaged as multiple components, but at least a portion of it is worn in close physical proximity to the ear. The implanted portion receives signals representing sounds transmitted by the transmitter of the externally worn portion, and contains an electrode or electrodes for stimulating the cochlea or auditory nerve. The implanted portion is a passive energy device containing no independent power source (it being expected to last for years in its surgically implanted position). When the externally worn portion is properly positioned for use, it is electromagnetically coupled with the implanted portion and supplies power to the implanted portion through the electromagnetic coupling.

A variety of everyday devices emit audible alarm or informational signals to alert individuals to some danger or condition which may require attention. Examples include fire or other emergency condition alarms, telephones, doorbells, alarm clocks, etc. If an individual having an implanted hearing assistive device is wearing the external portion and it is functioning normally, the individual should be able to hear most everyday audible alarms. However, most persons with cochlear implants or similar devices remove the externally worn portion at least part of the time. For example, the externally worn portion is often removed while sleeping, both for reasons of comfort, and to avoid inadvertent damage to the unit while sleeping. It is also typically removed while bathing, and sometimes may be removed purely for relaxation, to shut out externally distracting noise. If an audible alarm sounds at a time when the individual has removed the externally worn portion, he will not hear the alarm. This fact poses inconvenience to individuals with implantable devices, and, particularly where they are sleeping, exposes them to additional danger as a result of the fact that they can not hear audible fire alarms and the like.

Various alarm systems have been proposed for hearing impaired individuals, but in general these suffer certain drawbacks, particularly when applied to a profoundly deaf person with cochlear or other implanted devices. The external portion of the cochlear implant hearing assistive device is normally removed when sleeping, deactivating the device. Because these individuals are profoundly deaf, they are generally immune to auditory alarms when asleep, even when the alarms are extremely loud. Some alarm systems rely on flashing lights or other visual stimuli, either alone or in combination with auditory stimuli, but many people do not respond reliably to visual stimuli when asleep. Vibrating alarms also exist, but these must be worn close to the body to ensure that the user will detect vibration; they may be uncomfortable or not necessarily be reliably sensed by the user when asleep, particularly if the device shifts position during sleep.

It would of course be possible for the hearing impaired individual to simply wear the external portion of the cochlear implant when asleep, but for many users this is impractical. It may be uncomfortable or difficult to sleep with the device in the ear. Furthermore, the device can easily fall out due to the user's movements while asleep, which would both render any alarm ineffective and subject the device to risk of loss or damage. These devices are quite expensive, and most users will not wish to risk damage to the devices. Additionally, removal of the device while sleeping allows moisture, which may accumulate in the device due to its proximity to the human body, to evaporate; this is believed to prolong the life of the device. Some manufacturers recommend that they be removed while sleeping for this reason.

A need exists for improved techniques to warn and/or inform certain individuals with profound hearing loss of dangers or other conditions, and particularly, for techniques which will be effective even in the absence of an externally worn unit for supplying a signal to an implantable device.

SUMMARY OF THE INVENTION

An alarm system for certain hearing impaired individuals having implanted hearing assistive devices contains a triggering device for detecting one or more conditions comprising an alarm, and a transmitter which is tuned to a resonant frequency of an implanted passive energy portion of a cochlear implant or similar device. Upon detection of an alarm condition, the transmitter transmits an alarm signal at the resonant frequency, causing the implanted device to resonate even in the absence of the externally worn hearing assistive portion. Resonance is perceived by the hearing impaired individual as a buzzing or other abnormal noise, alerting the individual to the alarm condition.

In the preferred embodiment, the triggering device is a programmable digital electronic device, capable of receiving alarm signals from multiple sources. Possible sources include: a building fire and/or smoke detector; a carbon monoxide detector; an intruder alert system; a telephone; a doorbell; and an alarm clock. These sources could be integrated with the triggering device (as would typically be the case of an alarm clock), or could be external devices which provide a signal to the triggering device. Selective sources may be filtered out according to the wishes of the user, and the user may program the triggering device to change filtering on a scheduled basis. For example, the user may wish to filter out (ignore) telephone calls during a time when the user is normally sleeping, but to generate an alarm responsive to a phone call at other times.

Preferably, the alarm system is placed in a fixed location convenient to the user, such as the user's home or apartment, and the alarm system's transmitter has sufficient range to activate an alarm anywhere in the home or apartment. For large homes, multiple transmitters may be used if necessary. A portable alarm system would alternatively be possible.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
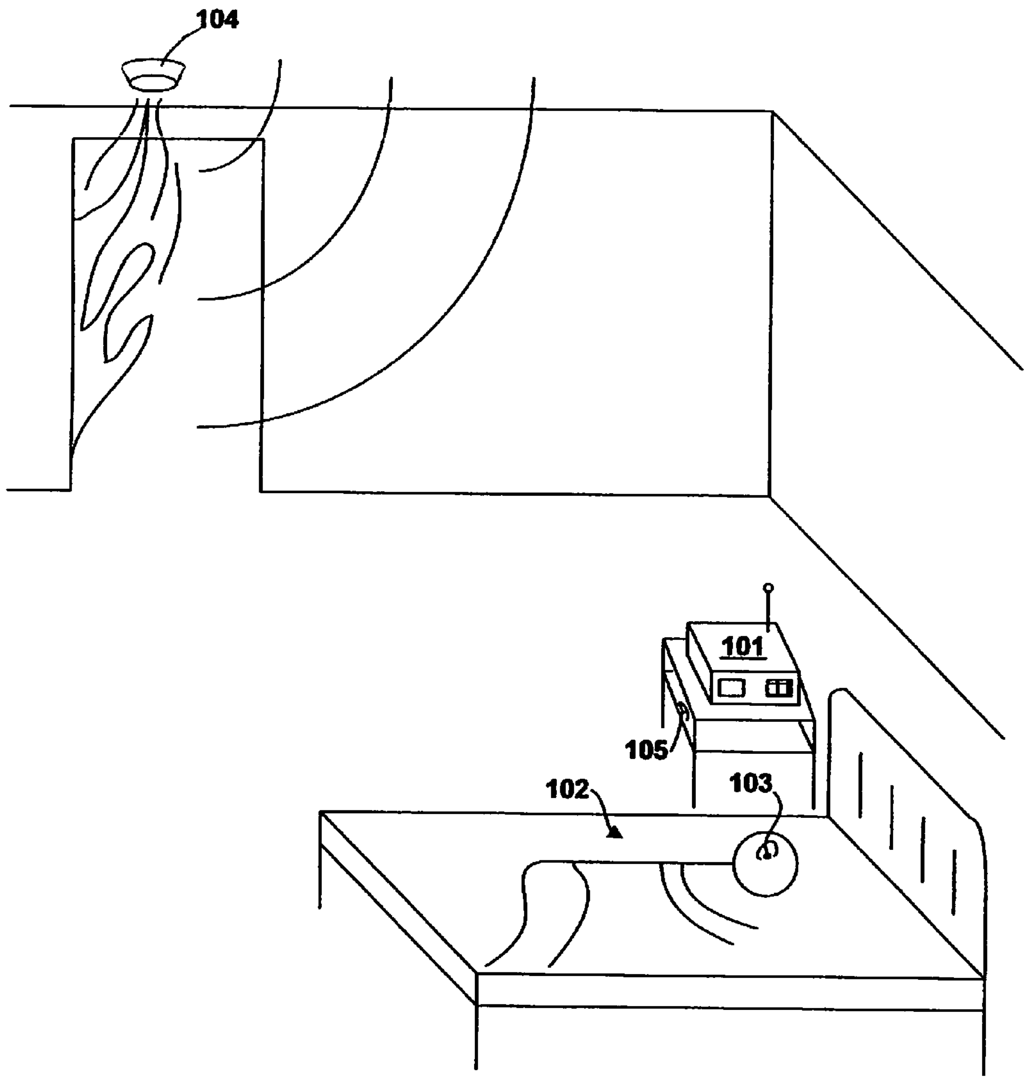
FIG. 1 is a representation of an exemplary operating environment of an alarm system for a hearing impaired individual, according to a preferred embodiment of the present invention.

Referring to the Drawing, wherein like numbers denote like parts throughout the several views, FIG. 1 is a representation of an exemplary operating environment of an alarm system for a hearing impaired individual, according to the preferred embodiment of the present invention. FIG. 1 depicts a hearing impaired individual 102 at rest or asleep in a bed. The hearing impaired individual has implanted in his ear an implantable portion 103 of a hearing assistive device, which is preferably an implantable portion of a cochlear implant device, although other implantable devices might alternatively be used. During normal operation, the implantable portion 103 is electro-magnetically coupled with an externally worn portion 105. Externally worn portion 105 contains a battery, microphone, sound processing electronics, and a transmitter for transmitting signals representing sound to the implantable portion 103. Implantable portion 103 is a passive device containing no independent source of power, and receives power in normal operation from the externally worn portion via the electromagnetic coupling. The design of such cochlear implant devices is known in the art.

In the environment represented in FIG. 1, externally worn portion 105 is resting on a nightstand remote from the user's ear, i.e., in a position in which it is not electromagnetically coupled to implantable portion 103. In this position, the externally worn portion is unable to communicate with the implantable portion, and even if the externally worn portion is powered on and senses a noise, the implantable portion will not be sensing a signal and will not be stimulating the hearing impaired user.

An alarm system 101 rests on the nightstand near the user. The alarm system internally detects one or more alarm conditions and/or receives one or more alarm signals from external detection devices. As an example represented in FIG. 1, an external fire and smoke alarm 104 senses the presence of a fire, and transmits an alarm signal to alarm system 101. In response to receiving the alarm signal from detector 104, alarm system 101 transmits an alarm signal to implantable portion 103 of the user's hearing assistive device, which, being implanted in the ear, is always present. The alarm signal transmitted by alarm system 101 to implantable portion 103 of the hearing assistive device is a signal transmitted at a resonant frequency of the implantable portion. The alarm signal causes the passive implantable portion to resonate, stimulating the user's cochlea or nerves with stimuli representing a buzzing or other unusual sound, even in the absence of power supplied by external portion 105. This sound awakens the hearing impaired user to the impending danger.

Figure 2:
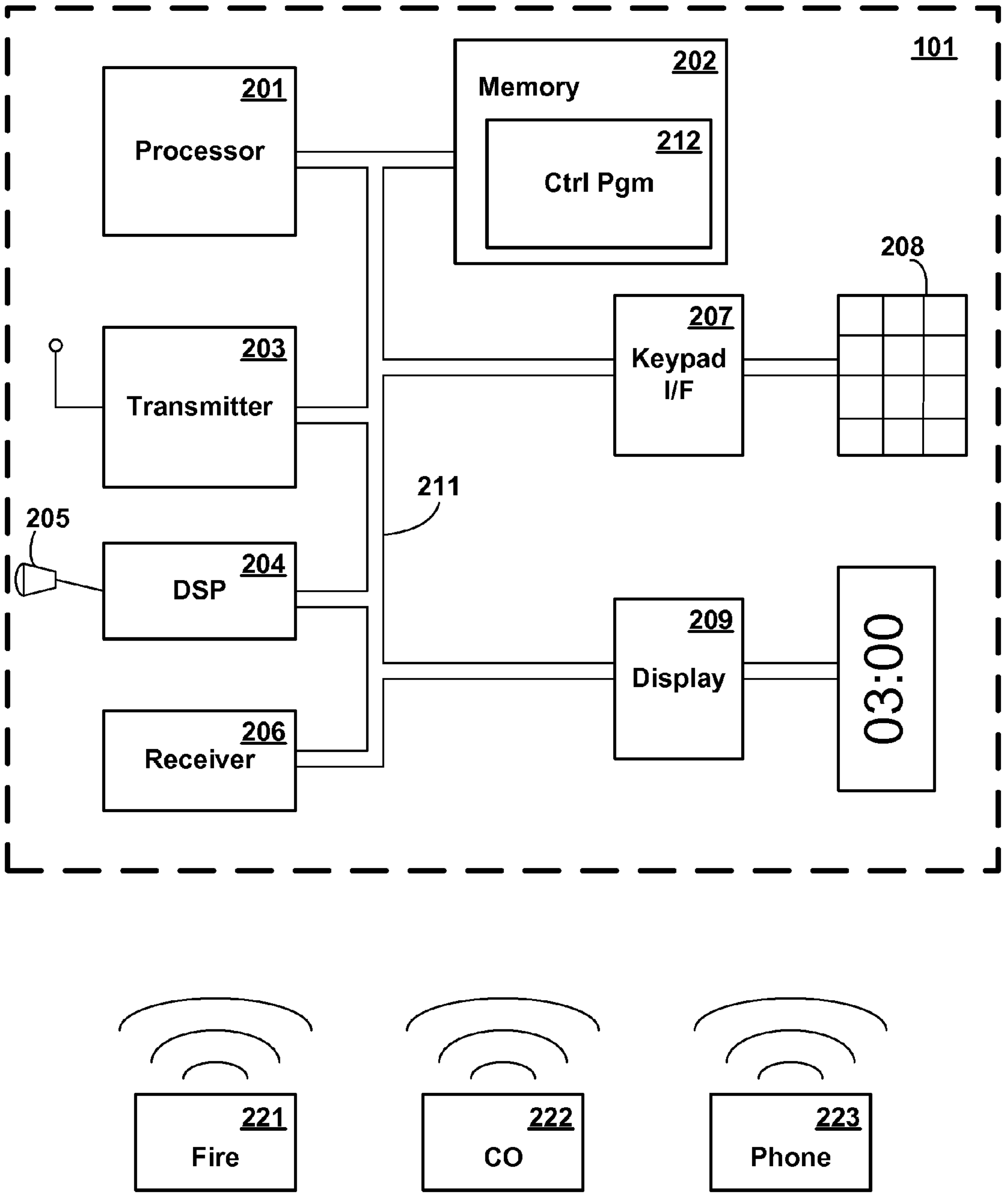
FIG. 2 is a simplified representation of the major hardware components of an alarm system for a hearing impaired individual, according to the preferred embodiment.

FIG. 2 is a simplified representation of the major hardware components of alarm system 101, according to the preferred embodiment. Alarm system 101 includes a programmable processor 201 which executes a control program 212 resident in internal random access memory 202 to generally control the operation of the alarm system's components. System 101 further includes a transmitter 203 for transmitting an alarm signal at a resonant frequency of an implanted portion of a hearing assistive device, as described herein. System 101 further preferably includes one or more means for receiving external alarm signals, as described herein. Alarm system 101 preferably further includes keypad interface driver 207 for sensing user input to a keypad 208, and display driver 209 for displaying information to a user on a visual display 210, which is preferably a small LED display, all of which are under the control of processor 201 executing control program 212. One or more communications buses 211 support communication among the various electronic components. Bus 211 is represented for clarity in FIG. 2 as a single entity, although it may in fact be multiple buses, bus interfaces, and associated components. Power to these various electronic components is typically preferably supplied by line voltage, with a backup battery (not shown) for supplying power in the event of a power outage.

In the preferred embodiment, alarm system 101 includes a microphone 205 for sensing ambient sounds and a digital sound processor 204 for processing the sound. External alarm signals may include ordinary audible signals which are perceived by microphone 205 and digital sound processor 204, such as an alarm buzzer of a fire alarm 221, carbon monoxide detector 222 or ringer of a telephone 223. Such an embodiment has the advantage of being able to detect alarm conditions from conventional audible devices, without requiring modification to the audible device. Alternatively, external alarm signals could also be radio frequency or other electromagnetic signals transmitted by any of devices 221-223, and received by an appropriate radio frequency receiver 206. Receiver 206 could alternatively be a receiver receiving signals transmitted as atmospheric electromagnetic radiation of some other frequency, such as infrared signals, or could be a hardwired receiver which receives signals over an electrically conductive wire, or an optical receiver which receives signals over an optical transmission medium, or any alternative technology, now known or hereafter developed, for receiving information from a remote device. Although receiver 206 is represented in FIG. 2 as a single device, it may alternatively comprise multiple devices for receiving signals from multiple sources, and such devices may be heterogeneous devices which receive signals of different types.

By way of example, FIG. 2 represents an external fire alarm 221, an external carbon monoxide detection alarm 222, and an external telephone 223 as possible sources of alarm signals received by microphone 205 and/or radio frequency receiver 206, it being understood that these three exemplary alarm devices are elucidated here by way of example only, and are not intended to limit the type of device which may provide an alarm signal to system 101. Furthermore, although it is preferred that an alarm is received from at least one device of a type which warns the hearing impaired person of a potentially dangerous condition, such as a fire or accumulation of carbon monoxide, an alarm device in accordance with the present invention might alternatively or exclusively provide alarm signals for conditions which involve no danger, but are merely of convenience or informational to the user. Conditions of such nature include an incoming telephone call, an activation of a doorbell, or the occurrence of a pre-set time of day (as in the case of an alarm clock).

In the preferred embodiment, with one exception the detection device which detects an alarm triggering condition is located external to alarm system 101, and communicates with it via microphone 205 or receiver 206. The one exception is the detection of time, which is preferably performed internally by control program 212. As is well known, digital electronic devices generally include an oscillator (not shown) and can readily be programmed to record time of day and one or more times for generating an alarm, without requiring any additional hardware. For this reason, it is preferred that alarm system 101 include a built-in alarm clock function as a convenience to the user. In general, it may be desirable for functional reasons to locate other alarm systems remotely. For example, a fire and smoke alarm should usually be located on a ceiling or other high place to better detect smoke and heat. However, one or more alarm detection devices could alternatively be integrated with alarm system 101.

Memory 202 contains a control program 212 comprising a plurality of processor-executable instructions which, when executed on processor 201, control the operation of the alarm system. Memory 202 preferably includes at least a portion which is strictly non-volatile, i.e., the data in the non-volatile portion is not lost in the event the memory receives no power, whether due to power failure, maintenance, or other event. Control program 212 is preferably stored in this portion of memory. Memory 202 may also include a volatile or dynamic portion for storing temporary values, counters, etc., or for logging alarm events, which depends on the presence of electrical power either from a line voltage source or a backup battery.

Control program 212 performs all the functions required to control the operation of alarm system 101. In the preferred embodiment, this includes an alarm function for receiving or sensing an alarm condition, and activating transmitter 203 in response to transmit a signal to the implanted portion 103 of the hearing assistive device. Control program 212 preferably performs various auxiliary functions in addition to the basic alarm function. Auxiliary functions in accordance with the preferred embodiment include a tuning function for tuning transmitter 203 to a resonant frequency of the implanted device, configuration and scheduling function for configuring defined alarm conditions, and a reset function for shutting off and resetting an alarm. The control program could include additional auxiliary functions. The operation of control program 212, is described in greater detail herein.

While a single control program 212 is represented in memory 202, it will be understood that this is shown for purposes of illustration only, and that a control program may have a more complex structure; it may comprise multiple modules of executable instructions, and allocate or utilize any of various data structures. Additionally, while alarm system 101 is represented in FIG. 2 as a limited purpose device, it will be appreciated that an alarm system could be embodied in a general purpose digital computer system, suitably programmed to implement the functions described herein, and containing or attached to any required hardware components, such as transmitter 203. A general purpose digital computer would typically contain various components in addition to those shown in FIG. 2, and may execute various other programs having functions unrelated to an alarm system.

Figure 3A:
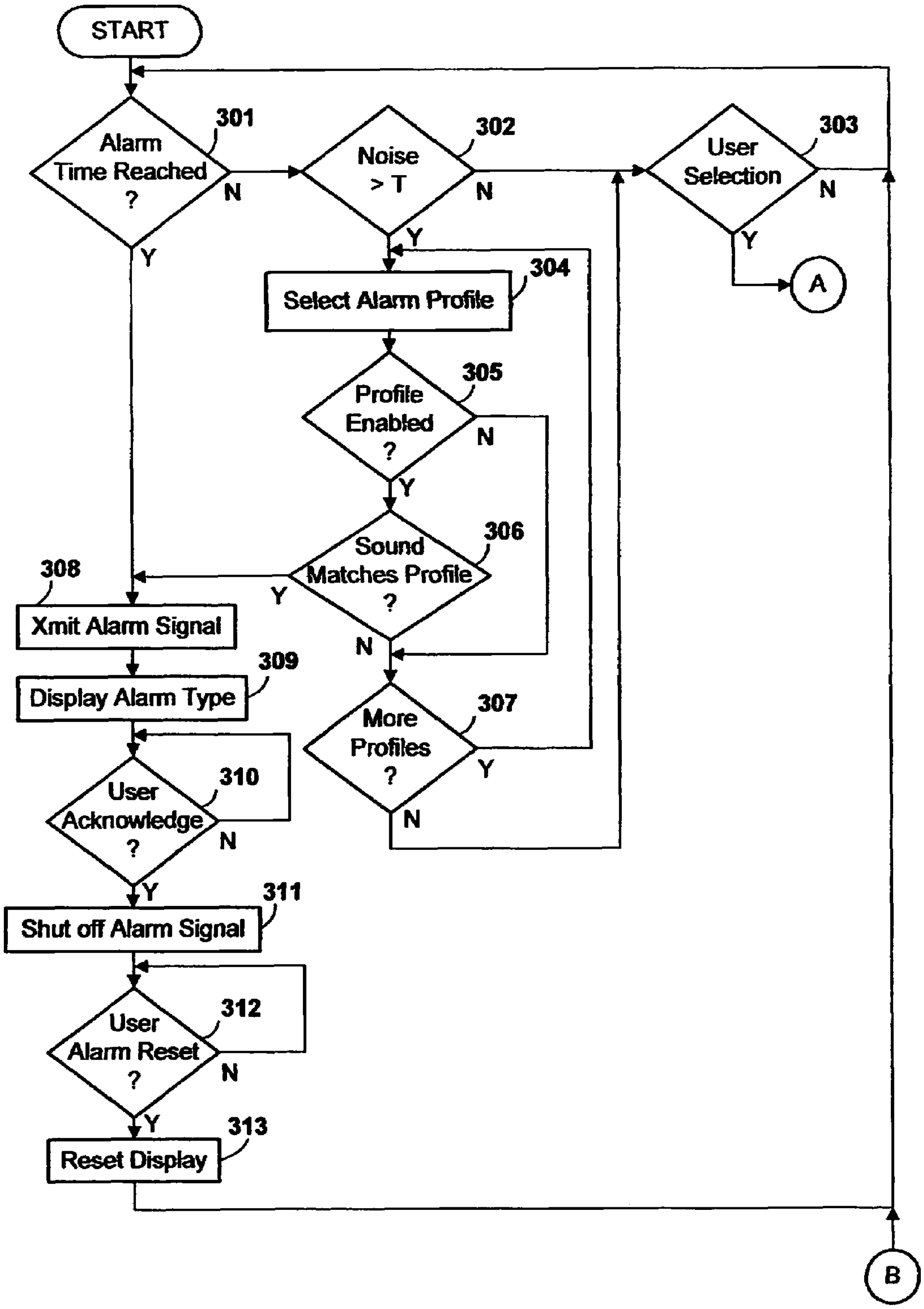
FIGS. 3A and 3B are collectively a high-level flow diagram showing the operation of an alarm system for a hearing impaired individual, according to the preferred embodiment.
Figure 3B:
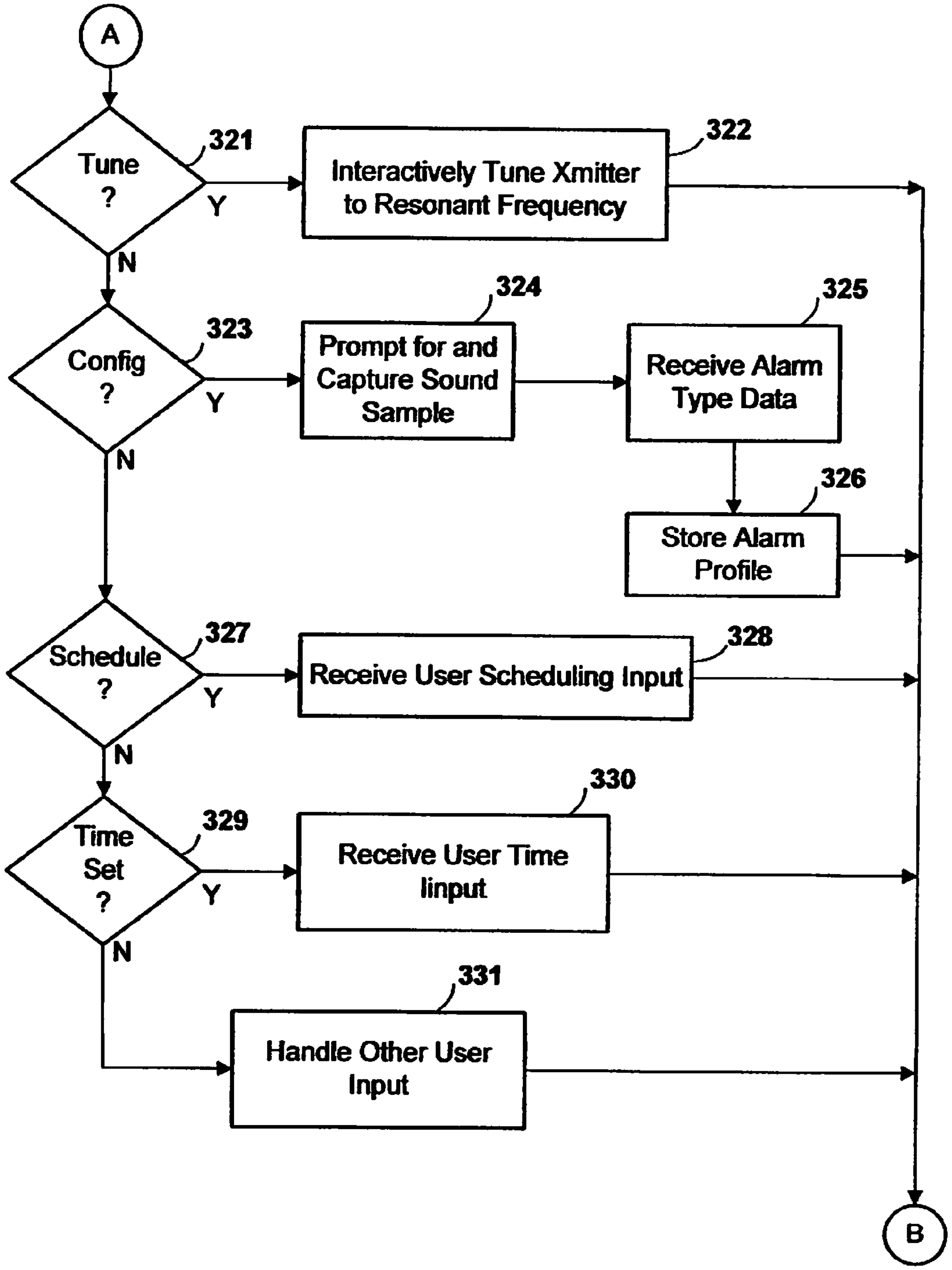

In accordance with the preferred embodiment of the present invention, control program 212 automatically detects an alarm condition and activates transmitter 203 to notify the hearing impaired user of the alarm. Additionally, control program allows the user to configure the system to recognize certain alarm conditions, tune the transmitter, and so forth. The operation of control program 212 is represented in the flow diagrams of FIGS. 3A and 3B, herein collectively referred to as FIG. 3.

Referring to FIG. 3, control program normally waits in a loop at steps 301-303 for some event requiring attention. Specifically, these events could be: (a) a clock or timer reaching a pre-determined value, thus triggering an alarm based on time; (b) the detection of a noise of sufficient volume that it could be an alarm condition; and (c) a user input via keypad 208 or other input device (not shown). If the control program detects that a clock or timer has reached a pre-determined value at which a user has previously specified that an alarm should be triggered, e.g., for waking the user in the morning, then the 'Y' branch it taken from step 301, causing an alarm signal to be transmitted at step 308. If the clock or time value has not been reached, the 'N' branch is taken from step 301. In this case, if digital signal processor 204 indicates that a sound of sufficient amplitude has been detected by microphone 205, then the 'Y' branch is taken from step 302 to attempt to identify the sound. If no such sound is received, the 'N' branch is taken from step 302 to step 303. If a user input has been received at the keypad, the 'Y' branch is taken from step 303 to process the input and perform any user required tasks. Otherwise, the 'N' branch is taken from step 303, and the control program continues to loop from steps 301 to 303.

If a sound is detected in excess of some threshold amplitude (the 'Y' branch from step 302), the control program attempts to match the detected sound with an existing alarm profile. It select a previously stored sound profile representing an alarm condition, such as the sound emitted by a fire alarm, carbon monoxide detector, telephone, doorbell, or other device (step 304). Sound profiles can be selectively enabled and disabled at different times of day. For example, a user may wish to disable a telephone sound profile at night when the user is normally sleeping, so that, even if the alarm system detects a telephone ringing, it will not respond by triggering an alarm to the user. Other sound profiles, such as a fire alarm, will typically be enabled an all times. If the selected profile is currently disabled, the 'N' branch is taken from step 305 to step 307, by-passing step 306. If the selected profile is currently enabled, the 'Y' branch is taken from step 305, and the control program compares the previously stored profile with sound currently being detected by microphone 205. If the profiles match, then the 'Y' branch is taken from step 306 and an alarm is triggered at step 308. If the profiles do not match, the 'N' branch is taken from step 306 to step 307. At step 307, if any more profiles remain to be considered, the control program takes the 'Y' branch to select a next profile at step 304. When all profiles have been examined without finding a match, the 'N' branch is taken from step 306 to step 303.

It will be appreciated that if alarms are received as external radio frequency signals, wired electronic data signals, or otherwise, or triggered by internal detection hardware, control program 212 would recognize these alternate triggering conditions as appropriate and trigger an alarm beginning at step 308.

If an alarm is triggered, either by taking the 'Y' branch from step 301 or the 'Y' branch from step 306, the control program activates transmitter 203 to transmit an alarm signal at a previously determined frequency (step 308). Preferably, the previously determined frequency is a calibrated or "tuned" frequency, as herein described, although the frequency could alternatively be selected by a user from multiple choices corresponding to different implantable devices, or could be fixed at time of manufacture. The alarm signal transmitted by transmitter 203 induces resonance in the passive implantable device 103 even in the absence of any power being supplied to the device or electromagnetic coupling with external portion 105 of the hearing assistive device, causing the user to perceive a buzzing or other unnatural noise.

The transmitted alarm signal is intended to induce resonance without the close coupling needed for reception of speech in normal use. Therefore the sound perceived by the user is not necessarily a natural sound, and does not necessarily convey information other than the fact that there is an alarm condition. The alarm signal could be continuous, to induce a continuous buzzing noise, or could be transmitted intermittently as buzzes of short duration, or buzzes of varying duration. In the preferred embodiment, there is only a single undifferentiated alarm signal for all alarm types. It would alternatively be possible to provide multiple different alarm signal types, e.g. by varying the duration of the transmissions, mixing short and long duration signals, mixing signals of differing amplitude, etc. It would further be possible to vary the signal strength, as by increasing the amplitude if the user does not respond within some pre-determined period.

Concurrently with activating the alarm, the control program causes additional information about the type of alarm to be displayed on LED display 210 (step 309). As explained above, the alarm signal may be undifferentiated, so that a hearing impaired user, upon perceiving the alarm signal transmitted by transmitter 203, can not necessarily distinguish a fire alarm from the telephone. Even where different types of alarm signals are used, such as different series of buzzes of different duration, a user may be confused as to the meaning of an alarm. Therefore, it is desirable to provide additional information on a visual display, so that the user can verify the type of alarm event.

After activating the alarm signal and displaying the alarm type, the control program waits for a response from the user at step 310. The user response is preferably to press a special key on the keypad or switch elsewhere on the alarm system, which acknowledges reception of the alarm signal. In response to detecting the user response, the 'Y' branch is taken from step 310, and the alarm signal is immediately deactivated (step 311). The signal should be readily deactivated once the user acknowledges receipt, because the signal itself may be somewhat disturbing or disorienting to the user.

Preferably, the alarm information displayed on the LED display remains displayed to the user after deactivating the alarm signal at step 311. The user must take a separate action to reset the alarm in order to clear the display. Control program 311 therefore waits for the user to issue a reset command at step 312. The reset command is preferably issued on the keypad, and may be issued by pressing a key or combination of keys. When the user reset command is detected, the display is reset to a default (e.g., a time of day, or a blank) (step 313, and the control program returns to its idle loop at step 301-303. It will be observed that if the alarm condition still persists when the user resets the alarm at step 312, it will immediately be triggered again.

The alarm system 101 can respond to a variety of user inputs, represented as the 'Y' branch from step 303. If a user input is received and is a tune command, the 'Y' branch is taken from step 321, and the system is placed in tune mode, represented as step 322. Tune mode is an interactive mode in which the user tunes the transmission frequency of the alarm signal transmitted by transmitter 203. This may be accomplished much the same way as a radio is tuned to a particular frequency for reception of a radio broadcast. For user convenience, it may further be possible to coarse tune the transmitter by inputting a manufacturer and model or other identifying data of the implanted device portion 103. Alarm system may store identifying data and approximate resonant frequency in a table, providing an approximation of the resonant frequency of the implanted device portion for tuning purposes. Whether or not the transmitter is first coarse tuned, interactive tuning comprises transmitting a signal (which may be of lower volume than a normal alarm signal) while the user adjusts the frequency of the transmitted signal until the user detects a peak in resonant noise emitted by the implanted device portion 103. Preferably, the tuning operation is performed without wearing the external portion 105 of the hearing assistive device, to avoid interference from the external portion. The user may optionally also adjust the amplitude of the alarm signal to an appropriate level. When the user is satisfied with the frequency and/or amplitude of the alarm signal, the user exits interactive tuning mode by appropriate keypad input, and the alarm system returns to its normal idle loop at steps 301-303.

If, at step 321, the user input was other than a tuning command, the 'N' branch is taken. If the user input was aconfiguration command (i.e., a command to recognize an alarm condition), the 'Y' branch is taken from step 323, and the alarm system enters a configure alarm condition mode. In this mode the user is promped to trigger an alarm for configuration purposes, and the alarm system receives and digitally processes the sound of the alarm (step 324). The alarm system further prompts the user for and receives interactive inputs concerning the type of alarm represented dythe signal (step 325). The data concerning the alarm type, and a digitally processed and reduced version of the alarm sound, are stored as an alarm profile (step 326). The alarm system then returns to its idle lop at steps 301-303.

If, at step 323, the user input was other than a configuration command, the 'N' branch is taken from step 323. In this case, if the user input is a scheduling command, the 'Y' branch is taken from step 327, and the alarm system enters an interactive scheduling mode, represented as step 328. In interactive scheduling mode, the user may interactively input scheduling data for an alarm, i.e., may specify that an "alarm clock" type alarm is to be triggered at a particular time or date/time, or may specify that a particular type of alarm is to be enabled or disabled at certain times or dates/times. By default, an alarm is enabled at all times, but the user may wish to override this default and disable non-critical alarms at times when normally asleep, or when it is likely to be otherwise inconvenient. When finished, the alarm system returns to the idle loop at steps 301-303.

If, at step 327, the user input was other than a scheduling command, the 'N' branch is taken from step 327. In this case, if the user input is a time set command, the 'Y' branch is taken from step 329, and the alarm system enters an interactive time set mode, represented as step 330. In interactive time set mode, the user may interactively set the current time and day in the alarm system's internal clock. When finished, the alarm system returns to the idle loop at steps 301-303.

If, at step 329, the user input was some other command, the 'N' branch is taken from step 329, and the user input is handled appropriately (step 331). The alarm system then returns to the idle loop at steps 301-303.

In general, the routines executed to implement the illustrated embodiments of the invention, whether implemented within alarm system 101 or some other digital data processing device as part of an operating system or a specific application, program, object, module or sequence of instructions are referred to herein as "programs" or "control programs". The programs typically comprise instructions which, when read and executed by one or more processors in the devices or systems consistent with the invention, cause those devices or systems to perform the steps necessary to execute steps or generate elements embodying the various aspects of the present invention. Moreover, while the invention has and hereinafter will be described in the context of fully functioning alarm system apparatus, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. An example of signal-bearing media is illustrated in FIG. 2 as memory 202.

Although a specific embodiment of the invention has been disclosed along with certain alternatives, it will be recognized by those skilled in the art that additional variations in form and detail may be made within the scope of the following claims:

What is claimed is:

1. An alarm system for a hearing impaired individual, said hearing impaired individual having a hearing assistive device comprising an implanted portion and an external portion, said implanted portion being implanted in said individual and receiving energy for operation from said external portion, said alarm system comprising:

a detector for detecting at least one alarm condition;

a transmitter for generating an alarm signal at a resonant frequency of said implanted portion of said hearing assistive device responsive to detection of said at least one alarm condition by said detector, said alarm signal causing said implanted portion of said hearing assistive device to resonate and alert said hearing impaired individual of said alarm condition in the absence of said external portion of said hearing assistive device.

2. The alarm system of claim 1, wherein, during operation of said hearing assistive device, said external portion and said implanted portion of said hearing assistive device are electromagnetically coupled in close proximity, said external portion supplying power through said electromagnetic coupling, said alarm system causing said implanted portion to resonate and alert said hearing impaired individual of said alarm condition in the absence of said electromagnetic coupling.

3. The alarm system of claim 1, wherein said hearing assistive device is a Cochlear implant hearing assistive device.

4. The alarm system of claim 1, wherein said alarm system is interactively tunable to transmit at a selective one of multiple different resonant frequencies.

5. The alarm system of claim 1, wherein said alarm system is programmable to filter at least one said alarm condition.

6. The alarm system of claim 5, wherein said alarm system is programmable to filter at least one alarm condition contingent upon a current time.

7. The alarm system of claim 1, wherein said detector comprises an apparatus which receives an indication of an alarm condition from an external device.

8. The alarm system of claim 7, wherein said detector comprises at least one microphone for sensing ambient sound generated by an external device.

9. The alarm system of claim 8, wherein said alarm system is configurable to recognize a plurality of different auditory inputs as respective alarm conditions for generating said alarm signal with said transmitter.

10. A method for alerting a hearing impaired individual of an alarm condition, said hearing impaired individual having a hearing assistive device comprising an implanted portion and an external portion, said implanted portion being implanted in said individual and receiving energy for operation from said external portion, said method comprising the steps of:

detecting the presence of an alarm condition, said step of detecting the presence of an alarm condition being performed by an automated device; and responsive to detecting the presence of said alarm condition, automatically transmitting an alarm signal at a resonant frequency of said implanted portion of said hearing assistive device, said alarm signal causing said implanted portion of said hearing assistive device to resonate and alert said hearing impaired individual of said alarm condition in the absence of said external portion of said hearing assistive device.

11. The method of claim 10, further comprising the step of:

interactively tuning an alarm system for transmitting said alarm signal at said resonant frequency.

12. The method of claim 10, wherein, during operation of said hearing assistive device, said external portion and said implanted portion of said hearing assistive device are electromagnetically coupled in close proximity, said external portion supplying power through said electromagnetic coupling, said step of transmitting an alarm signal causing said implanted portion to resonate and alert said hearing impaired individual of said alarm condition in the absence of said electromagnetic coupling.

13. The method of claim 12, wherein said hearing assistive device is a cochlear implant hearing assistive device.

14. The method of claim 10, wherein said automated device is capable of detecting a plurality of alarm conditions and is programmable to filter at least one said alarm condition.

15. The method of claim 10, wherein said step of detecting the presence of an alarm condition comprises sensing a sound generated by a device external to said automated device.

16. The method of claim 15, further comprising the step of interactively training said automated device to recognize a plurality of different auditory inputs as respective alarm conditions for transmitting said alarm signal.

17. A program product for alerting a hearing impaired individual of an alarm condition, said hearing impaired individual having a hearing assistive device comprising an implanted portion and an external portion, said implanted portion being implanted in said individual and receiving energy for operation from said external portion, said program product comprising:

a plurality of instructions tangibly recorded on a computer-readable medium and executable by at least one digital data processing device, wherein said instructions, when executed by said at least one digital data processing device, cause the at least one digital data processing device to perform the steps of:

detecting the presence of an alarm condition; and responsive to detecting the presence of said alarm condition, transmitting an alarm signal at a resonant frequency of said implanted portion of said hearing assistive device, said alarm signal causing said implanted portion of said hearing assistive device to resonate and alert said hearing impaired individual of said alarm condition in the absence of said external portion of said hearing assistive device.

18. The program product of claim 17, wherein said plurality of instructions further cause the at least one digital data processing device to perform the step of:

tuning a frequency at which said alarm signal is transmitted responsive to interactive input from a user.

19. The program product of claim 17, wherein, during operation of said hearing assistive device, said external portion and said implanted portion of said hearing assistive device are electromagnetically coupled in close proximity, said external portion supplying power through said electromagnetic coupling, said step of transmitting an alarm signal causing said implanted portion to resonate and alert said hearing impaired individual of said alarm condition in the absence of said electromagnetic coupling.

20. The program product of claim 19, wherein said hearing assistive device is a cochlear implant hearing assistive device.

* * * * *